Oct. 11, 1949.   D. W. HAMM   2,484,288
STEEL PISTON RING
Filed Dec. 22, 1947
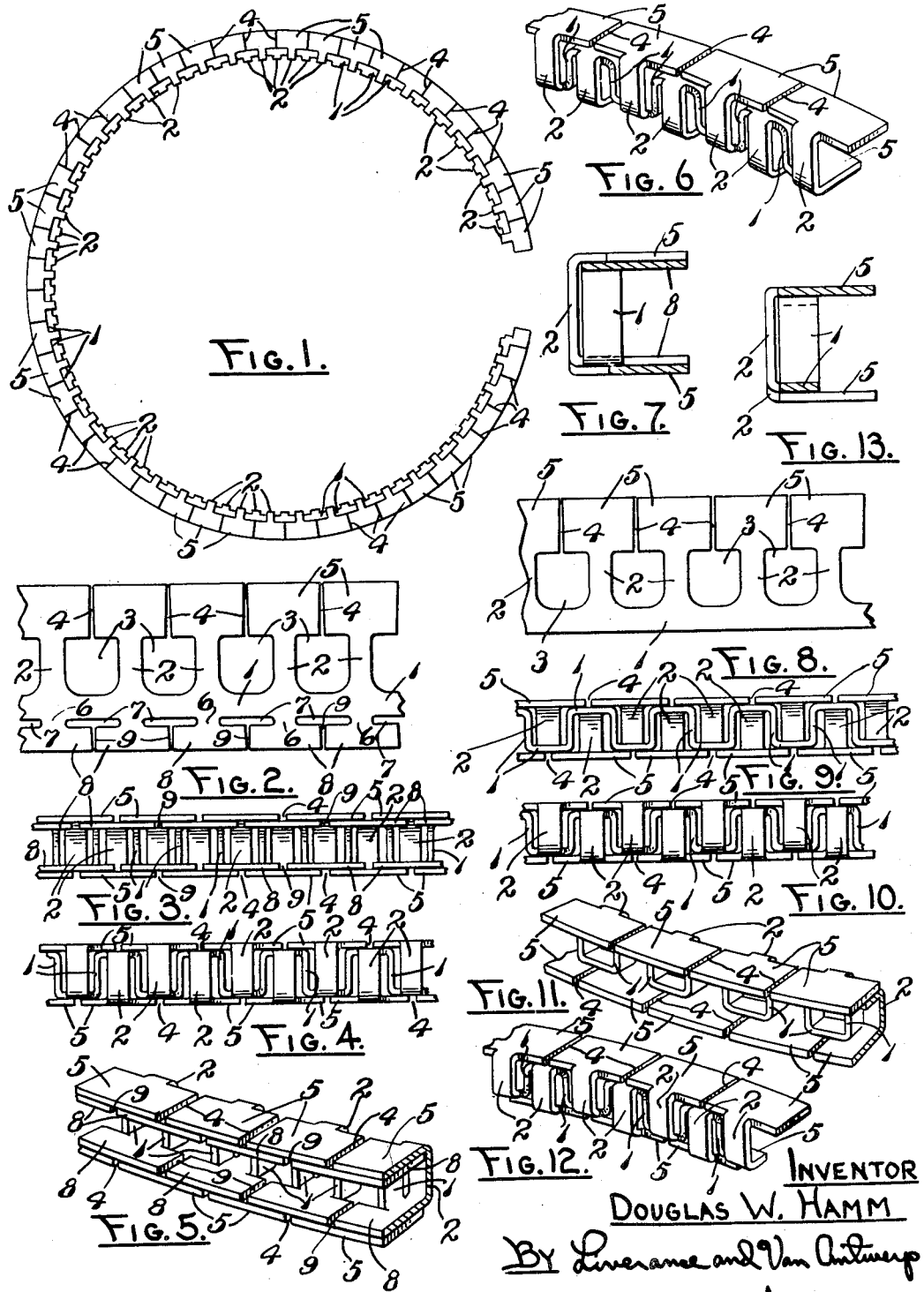
INVENTOR
DOUGLAS W. HAMM
BY Liverance and Van Antwerp
ATTORNEYS Patented Oct. 11, 1949

2,484,288

UNITED STATES PATENT OFFICE 2,484,288

STEEL PISTON RING

Douglas W. Hamm, Muskegon, Mich., assignor to Muskegon Piston Ring Company, Muskegon, Mich., a corporation of Michigan Application December 22, 1947, Serial No. 793,291

6 Claims. (Cl. 309—45)

This invention is directed to a novel construction of piston ring, made from a single length of thin steel material, preferably, though other metallic materials may be used, which when completed provides a piston ring particularly adapted for service in the lower groove or grooves of pistons in motor vehicle internal combustion engines, from which grooves passages lead to the interior of the piston for returning excess oil to an engine crankcase.

With my invention a vented oil conserving piston ring is made, excess oil being removed from cylinder walls and carried through vented openings in the ring to the bottom of the oil drainage groove of a piston in which installed. The ring may be made with either a single thickness of metal bearing against the cylinder walls, preferably at both the upper and lower sides of a piston ring groove, or in a form preferred for some reason, with a double thickness of such metal at both the upper and lower sides of a ring groove. Such double thickness increases the effective life of a piston ring as the peripheral wear at the bearing edges of the ring against a cylinder wall is reduced because of the greater area of bearing against such cylinder wall. The double thickness of bearing edges also allows accurate control of unit pressure on these bearing edges which need not be any higher than necessary, thus reducing wear.

With my invention there is not only a connection between a very large number of ring sections in both the upper and lower sides of the piston ring, which connection is of a strut type, the struts being located substantially in radial planes with respect to the center of the ring, but additionally there are vertical flexible connections and supports at the inner curved side of the piston ring. The ring is circumferentially contractible, with a stressing of the strut structure whereby the tension in the ring when it is circumferentially contracted within a cylinder wall is produced, thereby providing a required unit pressure of the bearing edges at the upper and lower sides of a ring against a cylinder wall.

It is an object and purpose of the present invention to provide a piston ring of the type noted, which is particularly useful, has a long life, and is made economically. The invention may be understood from the following description, taken in connection with the accompanying drawing, in which, Fig. 1 is a plan view of a ring made in accordance with my invention, Fig. 2 is a fragmentary plan of a length of thin flat spring metal from which a ring having a double thickness bearing of metal at both its upper and lower sides, is produced, Fig. 3 is a fragmentary edge view of the completed ring, looking at said ring from the outside thereof, Fig. 4 is a fragmentary inner elevation of the finished ring, Fig. 5 is a fragmentary perspective view of the ring looking at it from the outside, Fig. 6 is a fragmentary perspective view of such ring, looking at it from the inside, Fig. 7 is a transverse vertical section, enlarged, through the ring shown in Figs. 3 to 6 inclusive, Fig. 8 is a plan view of a blank, similar to Fig. 2, from which the ring structure with one thickness of metal bearing against a cylinder wall is produced, Fig. 9 is a fragmentary outside edge elevation of the finished ring, Fig. 10 is a fragmentary inside elevation thereof, Fig. 11 is a fragmentary perspective view of the ring made from the blank shown in Fig. 8, the view being from the outer side of the ring, Fig. 12 is a fragmentary perspective view from the inner side of the ring, and Fig. 13 is an enlarged transverse section therethrough.

Like reference characters refer to like parts in the different figures of the drawing.

The blank of thin metal from which the single thickness metal bearing sections against the cylinder walls are made, shown in Fig. 8, comprises an elongated strip which at one longitudinal edge has a narrow band 1 continuous from one end of the metal strip to the other. From such band 1, at its inner edges, integrally spaced apart legs 2 extend at right angles, being separated by rectangular openings 3 as shown. Said openings 3 at their sides opposite the continuous band 1 have slots 4 extending therefrom to the other longitudinal edge of the strips. The slots 4, which are slightly wider at their inner ends, divide the opposite longitudinal portions of the metal strip into a plurality of generally rectangular sections 5. Such sections 5 at their straight outer edges are ground on a radius of the piston ring which is to be produced, and of course are slightly narrower at their inner sides than at their outer curved edges.

In the formation of the piston ring from the thin metal blank which has been described, the band 1 is shaped into an alternate reverse series of U-shaped loops, best shown in Fig. 9. The legs of the looped band connect integrally with the upper and lower horizontal sections of the corrugated band produced. From each of said upper and lower horizontal sections, a leg 2 extends, and all the legs are turned at right angles so as to extend vertically, as shown in Figs. 9 and 10, part of them upwardly from the lower horizontal sides 5 of the U-shaped loops of the corrugated band 1, and the others downwardly from the upper horizontal sides 5 of the alternate loops. At the free ends of the parts 2 the sections 5 are turned outwardly at right angles to lie against the outer sides of the adjacent horizontal sections of the U-shaped loops of the corrugated band 1. Thus, with the struts 2 alternately extending upward and downward from the horizontal portions of the loops of the corrugated band 1, the successive sections 5 in the blank, as shown in Fig. 8, are located alternately at the upper and lower sides of the completed ring and such alternate sections have their side edges close together. Because the slots 4 have a slight progressive widening from their outer to their inner ends in the blank shown in Fig. 8, the division lines between successive sections 5 at both the upper and lower sides of the ring are on radial lines extending outwardly from the center of the ring, as shown in Fig. 1. Likewise, the curved outer edges of the sections 5 are in a circle after grinding. At the parting of the ring (Fig. 9) an upper section 5 will overlap and lie over the upper side of a horizontal portion of the opposite end U-loop made from the band 1, and the lower section 5 at the opposite end will extend underneath said upper section, providing substantially a staggered joint when the ends of the ring at the parting are brought together and closed upon contraction of the ring when within a cylinder.

The ring is contractible circumferentially by stressing the vertical legs of the loops of the corrugated band 1. The metal of the ring being preferably of a steel having elasticity and resiliency, the circumferentially contracted ring will tend to expand outwardly under the resistance of said vertical legs of the corrugated band 1 to the deformation which occurs upon circumferential contraction. The outer edges of the upper and lower sections 5 bear against a cylinder wall when the ring is in service. The struts 2 at the inner side of the ring, integrally connected each to a section 5, at the opposite side of the ring has an integral connection at its other end to the continuous corrugated band 1 which has been shaped into the connected series of U-shaped loops alternately open at opposite upper and lower sides. The vertical legs of such U-shaped loops support the horizontally extending sections 5 and prevent any tendency to fluttering vibrations which might occur if there was not this interposed support between the upper and lower ring sections 5.

In the structure of the ring where two thicknesses of the metal are used for each of the bearing lands of the ring, the blank shown in Fig. 2 is similar to that shown in Fig. 8, but with the addition of sections integral with and at the outer side of the band 1, which in Fig. 8 at its outer side has a plain continuous edge. Directly opposite each of the legs 2 are short connections 6 located between narrow slots 7, which have a length substantially equal to the width of the rectangular openings 3. Beyond said connecting sections 6 are sections 8, similar to the sections 5 but narrower in width and which are separated at their ends from each other by slots 9, having their greatest width at their inner ends and extending from the middle portions of the slots 7 outwardly and progressively decreasing in width to the outer edges of the sections 8.

The bending and folding of the parts follows the same pattern as in the previously described rings. The band 1 is formed into a corrugated bend with alternately positioned U-shaped loops having open ends at opposite sides of the corrugated bend thus formed. The sections 8 thereupon extend in the same plane with the horizontal portions of the U-bends of the corrugated strip 1 and with the completion of the ring are located at the inner sides of the upper and lower sections 5, extending across the radial divisions 4 between adjacent ends of the sections 5.

It is evident that the dimensions in width of the sections 8 may be such that their outer edges will be flush with the outer edges of the sections 5; or such outer edges may extend a few thousandths of an inch beyond the outer edges of the sections 5, or be located within such edges a short distance, measured in thousandths of an inch. The width of the sections 8 may be controlled to provide this, as such widths are not dependent upon the dimensions of the other parts of the blank from which the ring is made. With the ring made with the outer edges of the sections 5 and 8, one extending outwardly a short distance farther than the other, the initial seating of the ring against a cylinder wall is facilitated, as the wear at the beginning is taken entirely by the one thickness of metal of the sections which extend slightly beyond the other at each the upper and lower bearing lands of the ring.

There are advantages in the second ring structure over the first. The quick seating advantage described is one. Thinner material may be used which will add to the life of the dies in making the rings. There is a greater range of adjustability for the desired ring tensions which may be wanted in rings of different sizes or which are to be used in different types of engines. The bridging of the radial divisions at 4 and 9 is a further advantage for sealing against undesired oil passage from below to above the ring.

The ring structure described is novel, practical and useful and has insurance against vibration or fluttering or any collapse thereof or undesired movement of the two bearing flanges of the ring toward each other, with an attainment of a desired ring tension productive of the required pressure of the bearing lands against a cylinder wall. The ring is made from a single piece of thin flat spring metal and in the second form described, increase in the wearing life of the ring is obtained in a practical manner.

The invention is defined in the appended claims and is to be considered comprehensive of all forms of structure coming within their scope.

I claim:

1. A piston ring comprising, a continuous elongated narrow corrugated band comprising successive integrally connected U-shaped loops alternately open at opposite upper and lower sides, an integral leg extending at one edge from the lower and upper side of each of said loops vertically, and a cylinder land bearing section at the free end of each leg located in a horizontal plane to bridge the open sides of said loops and extend partly over said upper and lower sides of adjacent loops.

2. A structure as defined in claim 2, and additional cylinder wall bearing lands, one connected with the closed upper or lower side of each loop, extending under and parallel to the first mentioned lands and covering the joints between said first mentioned lands.

3. In a generally circular piston ring made from a single length of thin flat spring metal, a continuous corrugated band having successive loops alternately open at opposite upper and lower sides, each of said loops having spaced vertical legs and a horizontal closed side, a strut at the inner edge of each of said closed sides, said struts alternately extending in opposite directions from the closed sides of said successive loops, said struts being located in planes substantially at right angles to the planes of the legs of said loops, and generally rectangular cylinder wall bearing lands integral with the free end portions of said struts, located horizontally at right angles to said struts extending over and beyond said corrugated band and covering the open sides of the loops thereof.

4. A structure as defined in claim 3, said lands being separated at adjacent ends by gaps radially disposed with respect to the center of the ring, and each of said lands at its outer free edge of generally arc shape and having a radius of curvature extending from said outer edge to the center of the ring.

5. A structure as defined in claim 3, each of the closed sides of said loops at the edge thereof opposite said struts having a second cylinder wall bearing land extending therefrom, and having integral connections between the middle portions of said last mentioned lands and the closed sides of the loops of said corrugated band, said second mentioned lands, extending under the adjacent end portions of two of said first mentioned lands and at their outer edges having generally the same outline.

6. A structure as defined in claim 5, the outer edges of the bearing lands and said bearing lands being independent of each other, whereby the outer edges of said lands may be selectively varied in position with respect to each other.

DOUGLAS W. HAMM.

REFERENCES CITED

The following references are of record in the file of this patent:

UNITED STATES PATENTS

| Number    | Name   | Date           |
|-----------|--------|----------------|
| 1,734,356 | Welch  | Nov. 5, 1929   |
| 1,783,886 | McFall | Dec. 2, 1930   |
| 2,267,367 | Bowers | Dec. 23, 1941  |
| 2,267,369 | Bowers | Dec. 23, 1941  |
| 2,272,632 | Bowers | Feb. 10, 1942  |
| 2,409,966 | Voity  | Oct. 22, 1946  |